United States Patent
Emma et al.

(10) Patent No.: US 10,606,487 B2
(45) Date of Patent: Mar. 31, 2020

(54) PARTITIONED MEMORY WITH LOCALLY AGGREGATED COPY POOLS

(71) Applicant: International Business Machines Corporation, Armonk, NY (US)

(72) Inventors: Philip G. Emma, Danbury, CT (US); Michael B. Healy, Cortlandt Manor, NY (US); Tejas Karkhanis, New York, NY (US); Ching-Pei Lin, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

(21) Appl. No.: 15/461,568

(22) Filed: Mar. 17, 2017

(65) Prior Publication Data

US 2018/0267722 A1    Sep. 20, 2018

(51) Int. Cl.
*G06F 12/00* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01); *G06F 3/0644* (2013.01);
(Continued)

(58) Field of Classification Search
CPC ...... G06F 3/0619; G06F 3/0644; G06F 3/065; G06F 3/067; G06F 12/1009;
(Continued)

(56) References Cited

U.S. PATENT DOCUMENTS 5,430,857 A * 7/1995 Kendall .............. G06F 12/1009
                                                          711/206
7,200,733 B2 * 4/2007 Hancock ............. G06F 12/1009
                                                          711/202
(Continued)

OTHER PUBLICATIONS

List of IBM Patents or Patent Applictions Treated as Related; (Appendix P), Filed Oct. 31, 2017, 2 pages.
(Continued)

*Primary Examiner* — Prasith Thammavong
(74) *Attorney, Agent, or Firm* — Cantor Colburn LLP; Kevin Michael Jordan (57) ABSTRACT

An aspect includes receiving a request to access data in a memory, the request from a requesting processor and including a virtual address of the data. It is determined, based on contents of a page table that a plurality of physical addresses in the memory corresponds to the virtual address. The physical addresses include a first physical address of a primary memory location in a first partition accessed via a bus that is communicatively coupled to a port of a first processor, and a second physical address of a secondary memory location in a second partition accessed via a bus that is communicatively coupled to a port of a second processor. Contents of the primary memory location in the first partition were previously copied into the secondary memory location. Based on the requesting processor, one of the physical addresses is selected and data at the selected physical address is accessed.

11 Claims, 5 Drawing Sheets

(51) Int. Cl.
*G06F 12/1045* (2016.01)
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 12/1054* (2013.01); *G06F 2212/1041* (2013.01); *G06F 2212/68* (2013.01)

(58) Field of Classification Search
CPC ............. G06F 12/1027; G06F 12/1054; G06F 2212/1041; G06F 2212/68
See application file for complete search history.

(56) References Cited

U.S. PATENT DOCUMENTS

| | | | |
|---|---|---|---|
| 7,472,107 B2 | 12/2008 | Agrawal et al. | |
| 7,490,213 B2* | 2/2009 | Zohar | G06F 3/0605 |
| | | | 711/173 |
| 8,539,197 B1* | 9/2013 | Marshall | G06F 13/00 |
| | | | 711/112 |
| 8,930,507 B2 | 1/2015 | Schmidt et al. | |
| 9,286,132 B2 | 3/2016 | Garza et al. | |
| 2001/0037435 A1* | 11/2001 | Van Doren | G06F 12/0284 |
| | | | 711/153 |
| 2003/0009623 A1* | 1/2003 | Arimilli | G06F 12/0813 |
| | | | 711/119 |
| 2003/0009631 A1* | 1/2003 | Arimilli | G06F 12/0817 |
| | | | 711/135 |
| 2004/0133751 A1* | 7/2004 | Collins | G06F 12/0284 |
| | | | 711/153 |
| 2004/0210792 A1 | 10/2004 | Foster et al. | |
| 2005/0240736 A1* | 10/2005 | Shaw | G06F 12/082 |
| | | | 711/146 |
| 2007/0061441 A1 | 3/2007 | Landis | |
| 2007/0067366 A1 | 3/2007 | Landis | |
| 2007/0250664 A1* | 10/2007 | Lyon | G06F 7/24 |
| | | | 711/118 |
| 2008/0263279 A1* | 10/2008 | Ramani | G06F 12/0831 |
| | | | 711/119 |
| 2009/0144731 A1 | 6/2009 | Brown | |
| 2014/0013074 A1* | 1/2014 | Koka | G06F 12/1045 |
| | | | 711/207 |
| 2014/0095810 A1* | 4/2014 | Loewenstein | G06F 9/546 |
| | | | 711/148 |
| 2014/0149712 A1* | 5/2014 | Steiss | G06F 12/1009 |
| | | | 711/206 |
| 2014/0164676 A1* | 6/2014 | Borchers | G06F 12/0246 |
| | | | 711/103 |
| 2014/0279894 A1* | 9/2014 | Loewenstein | G06F 16/904 |
| | | | 707/634 |
| 2015/0052529 A1* | 2/2015 | Benhase | G06F 9/526 |
| | | | 718/102 |
| 2015/0186069 A1 | 7/2015 | Sharma et al. | |
| 2015/0317190 A1 | 11/2015 | Ebcioglu et al. | |
| 2016/0117115 A1* | 4/2016 | Mehra | G06F 3/0631 |
| | | | 711/112 |
| 2016/0306741 A1* | 10/2016 | Lam | G06F 9/5033 |

OTHER PUBLICATIONS

Philip G. Emmal, et al., Pending U.S. Appl. No. 15/798,750 entitled "Partitioned Memory With Locally Aggregated Copy Pools," filed Oct. 31, 2017.

* cited by examiner

PARTITIONED MEMORY WITH LOCALLY AGGREGATED COPY POOLS

BACKGROUND

Embodiments of the invention relate to computer memory, and more specifically to partitioned memory systems with locally aggregated copy pools.

SUMMARY

Embodiments of the invention include methods, systems, and computer program products for implementing a partitioned memory system with locally aggregated cache pools. An example method includes receiving a request to access data in a partitioned memory, the request from a requesting processor and including a virtual address of the data. It is determined, based at least in part on contents of a page table, that a plurality of physical addresses in the memory corresponds to the virtual address. The physical addresses include a first physical address of a primary memory location in a first partition accessed via a first memory bus that is communicatively coupled to a port of a first processor, and a second physical address of a secondary memory location in a second partition accessed via a second memory bus that is communicatively coupled to a port of a second processor. Contents of the primary memory location in the first partition were previously copied into the secondary memory location in the second partition. Based at least in part on the requesting processor, one of the physical addresses is selected and data at the selected physical address is accessed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

One or more embodiments of the invention described herein provide a partitioned memory system that includes a unified memory physically separated into disjoint partitions connected to a processor through different ports, with a portion of each partition used to store copies of data that resides in a different partition. In accordance with one or more embodiments of the invention, the segments that are copied can be chosen by standard hardware mechanisms, such as most recently used (MRU). The segments can also be copied under the direction of software that is at the application level or within the operating system (OS). In one or more embodiments of the invention, coherence is maintained between the copied segments using any known coherence methods or protocols.

As described herein, in one or more embodiments of the invention, the partitioned memory system stores multiple copies of the same data at different physical memory locations. When a request to access the data is received from a processor, one of the physical memory locations is selected for the access. The selection can be based at least in part on attributes of the requesting processor combined with attributes of the different physical memory locations. For example, if one of the physical memory locations is in a memory partition that is communicatively coupled to the requesting processor via a memory bus, then that physical memory location can be selected for the requested access to the data. In accordance with one or more embodiments of the invention, a page table that allows storage of multiple physical addresses for each virtual address is utilized to track the multiple physical memory locations of the data. Copies of the page table can be stored on each of the requesting processors and their contents kept synchronized.

The ability to replicate and provide local access to the data (e.g., via a memory bus communicatively coupled to a port on the requesting processor) can provide performance improvements when compared to traditional methods where a single copy of the data is stored in a physical memory location that is not local to the requesting processor. Using traditional methods, when the data is not local to the requesting processor, the requesting processor requests the data from another processor via, for example, a symmetric multiprocessing (SMP) bus. This request uses bandwidth on the SMP bus, as well as processing cycles on the other processor to receive and service the request, and can result in performance penalties for the data access. By providing local access to a copy of the data, the extra processing on the SMP bus and the other processor can be eliminated during data accesses.

As used herein, the term "locally aggregated copy pools" refers to physical memory locations of copies of data that are stored locally to processors that are accessing the data. For example, a system can include a first processor with a first port that is connected to a first memory bus that is connected to a first partition of a physical memory. The system can also include a second processor with a second port that is connected to a second memory bus that is connected to a second partition of the physical memory. The first partition of the physical memory can have a copy pool (e.g., a portion of physical memory) that includes copies of data that are accessed frequently by the first processor. The copies can be made of data in other partitions, such as the second partition. By having the locally aggregated copy pool (also referred to herein as a "copy block") in the first partition, access to the data by the first processor is local, and therefore the accesses can be performed using fewer resources and less elapsed time when compared to non-local data accesses (e.g., via another processor).

As used herein, the terms "communicatively coupled" and "connected" are used interchangeably to refer to a communication path, wired or wireless, between two entities such as, but not limited to: a memory bus and a processor; a first processor and a second processor; and a memory bus and a physical memory.

Figure 1:
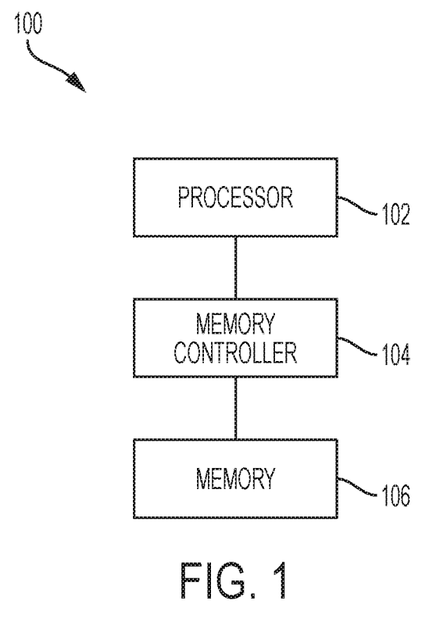
FIG. 1 is a block diagram of a system for implementing locally aggregated copy pools in accordance with one or more embodiments of the invention.

Turning now to FIG. 1, a block diagram of a system 100 for implementing locally aggregated copy pools in accordance with one or more embodiments of the invention is generally shown in accordance with one or more embodiments of the invention. The system 100 includes a processor 102 that executes an application and/or OS that can request access to data stored in a memory 106. Requests of reads or writes to the memory 106, from the processor 102, are sent to a memory controller 104 for processing. The memory controller 104 can perform a number of tasks including, but not limited to, translation of virtual addresses to real addresses, and buffering of requests. In embodiments of the invention described herein, the memory controller 104 can also execute instructions to implement locally aggregated copy pools in accordance with one or more embodiments of the invention. Though shown as separate physical components in FIG. 1, one or more of the memory controller 104, the memory 106, and the processor 102 can also be co-located on a single physical component. In an embodiment, the memory 106 is main memory that is internal to the processor and implemented by a dynamic random access memory (DRAM) device.

Figure 2:
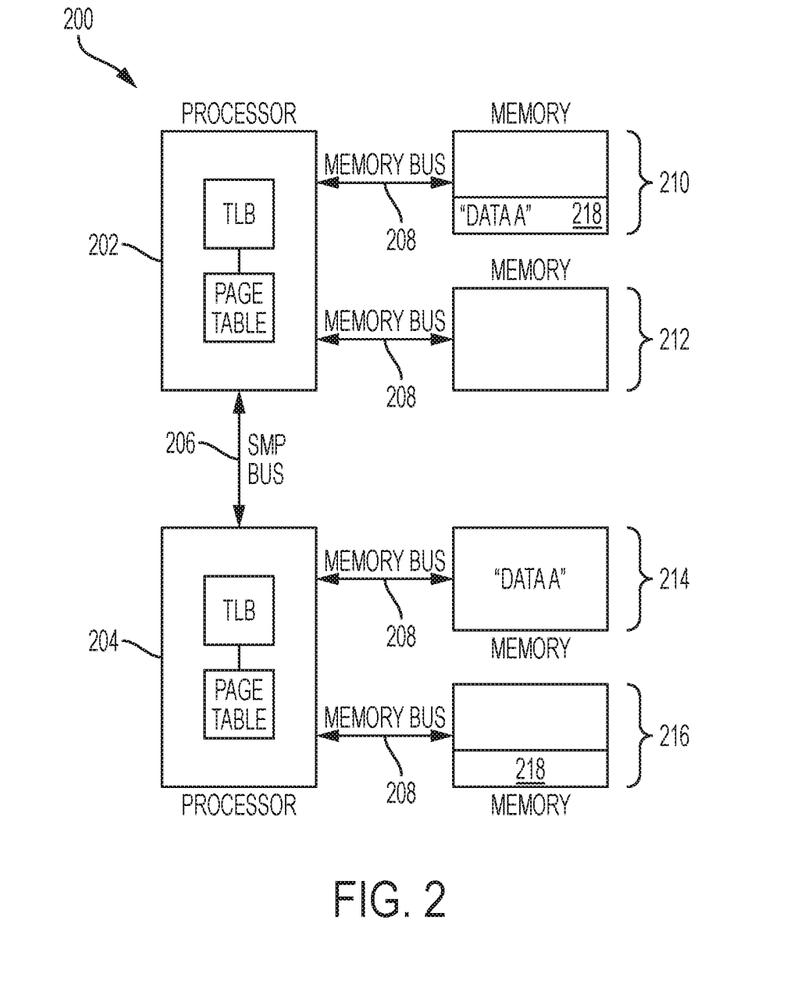
FIG. 2 is a block diagram of a system with locally aggregated copy pools in accordance with one or more embodiments of the invention.

Turning now to FIG. 2, a block diagram of a system 200 with locally aggregated copy pools is generally shown in accordance with one or more embodiments of the invention. The system 200 shown in FIG. 2 includes a plurality of processors 202 204 each connected to a plurality of memory partitions 210 212 214 216 via memory busses 208, and connected to each other via a SMP bus 206. Two copy pools or copy blocks 218 are also depicted in the system 200. Any known technology can be used to implement the SMP bus 206 and the memory busses 208. The SMP bus 206 is not dedicated to servicing memory requests, and can also be utilized for a variety of communications between the processors 202 204 such as, but not limited to: cache coherence or I/O operations (e.g. networking or storage accesses). In accordance with one or more embodiments of the invention, the SMP bus 206 can have interface bandwidths of around 40 Gigabyte/second (GB/s). This is contrasted with memory busses 208 which in accordance with one or more embodiments of the invention is dedicated to servicing memory requests and can have total bandwidth in excess of 200 GB/s.

In accordance with one or more embodiments of the invention, each of the processors 202 204 also include a translation look-aside buffer (TLB) and a page table. As is known in the art, the TLB is a cache of the page table and stores recent translations between virtual addresses and physical addresses. References herein to the page table refer to both the TLB and the page table. In accordance with one or more embodiments of the invention, conventional page tables are extended to include additional entries that allow more than one physical address to correspond to each virtual address. In this manner, the copies of the data described herein are tracked by the page table. Thus, when a request is received to access data at a virtual address, the virtual address can be translated using the page table into one of two (or more) different physical addresses.

In accordance with one or more embodiments of the invention, processor 202 requests access to data (labeled "DATA A") that is natively stored in memory partition 214. In contemporary implementations, this is performed by processor 202 continually sending requests to processor 204 via the SMP bus 206. In contrast, in accordance with one or more embodiments of the invention described herein, large blocks of memory can be copied from memory locations in memory partition 214 into copy block 218 that is contained in memory partition 210. Once the blocks of memory corresponding to the data are stored in copy block 218, processor 202 can access the data locally (e.g., via a memory bus 208) from memory partition 210. This avoids the requesting processor 202 from having to send requests to processor 204. One or more embodiments of the invention can be used when threads on both processor 202 and processor 204 need to touch the data ("DATA A") stored natively in memory partition 210, and will reduce traffic on the shard SMP bus 206. This example includes moving data from memory partition 214 to copy block 218. In other scenarios in accordance with one or more embodiments of the invention, the data is moved from memory partition 210 or memory partition 212 to copy blocks 218 in memory partition 214 or memory partition 216. In further scenarios the data is moved from memory partition 216 to copy blocks 218 in memory partition 210 or memory partition 212.

In accordance with one or more embodiments of the invention, processor 202 and processor 204 are both performing processing on data stored in memory partition 214 which is attached to processor 204. The SMP fabric on one or both of the processors 202 204 notices this condition (e.g., by detecting more than a specified amount of coherence traffic). In accordance with one or more embodiments of the invention, if both processors 202 204 are primarily reading the data, with very few writes, the data copying is initiated. A section or region of memory large enough to contain the data, a copy block 218, is allocated in memory partition 210 and the read/write transactions to copy the data from memory partition 214 to the copy block 218 in memory partition 210 are initiated. In accordance with one or more embodiments of the invention, after allocation, but before the copying of the data to the new location in copy block 218 is completed, the regions of the copy block 218 without proper data are marked as invalid (e.g., using spare error correcting code bits or cache entries). After valid data is written, the copies are marked valid and processor 202 can access data in memory partition 210 instead of memory partition 214. The page tables, including the TLB if needed, in both of the processors 202 204 are updated to indicate that multiple physical memory locations contain valid data for the copied virtual address.

In accordance with one or more embodiments of the invention, all of the physical memory locations are marked as (local) read-only copies. When a write occurs to the addresses that have multiple physical locations for a single virtual address, a page table update can be broadcast to all processors so that all copies are marked as invalid. A write of the data can then be performed to one physical address, and the page table updated to correlate the virtual address with the one physical address. In accordance with one or more embodiments of the invention, when a write occurs to a virtual address that corresponds to multiple physical locations, the write is performed to all of the physical locations specified by the page table for the virtual address.

For ease of description, the example in FIG. 2 shows two processors, however embodiments of the invention are not limited to two processors. The number of physical addresses corresponding to one logical address can increase based at least in part on the number of processors connected by SMP busses. For example, when there are three processors, each logical address can corresponding to up to three physical addresses; and when there are "N" processors, each logical address can correspond to up to "N" physical addresses.

Figure 3:
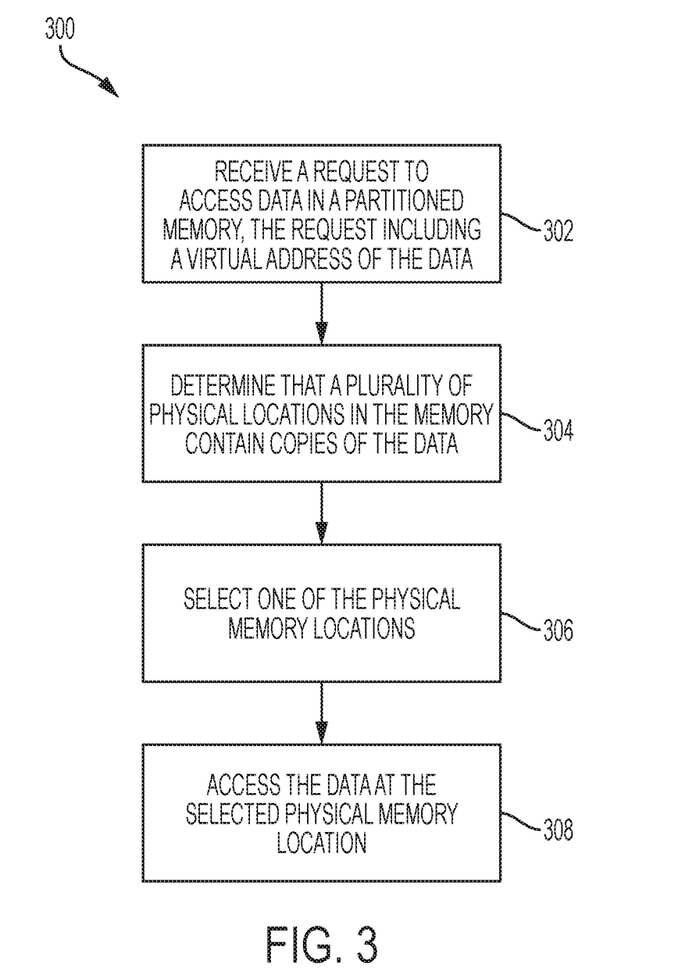
FIG. 3 is a flow diagram of a process for utilizing locally aggregated copy pools in a partitioned memory system in accordance with one or more embodiments of the invention.

Turning now to FIG. 3, a flow diagram 300 of a process for utilizing locally aggregated copy pools in a partitioned memory system is generally shown in accordance with one or more embodiments of the invention. All or a portion of the processing shown in FIG. 3 can be performed by computer instructions located, for example, in memory controller 104 or processor 202. At block 302, a request to access data in a partitioned memory is received from a requesting processor. The request can include a virtual address of the data. At block 304, it is determined, based at least in part on contents of a page table that a plurality of physical addresses in the memory corresponds to the virtual address. The physical addresses can include, in the case of two processors, a first physical address of a primary memory location in a first partition accessed via a first memory bus communicatively coupled to a port of a first processor. The physical addresses can also include a second physical address of a secondary memory location in a second partition accessed via a second memory bus communicatively coupled to a port of a second processor. Referring to FIG. 2, the requesting processor can be processor 202, the first physical address can correspond to the data (e.g., "DATA A") stored in memory partition 214, and the second physical address can correspond to the data (e.g., "DATA A") stored in copy block 218 in memory partition 210. Referring back to FIG. 3, at block 306, one of the physical addresses is selected based, for example, on attributes of the requesting processor and on physical locations of the data. At block 308, the data is accessed by the requesting processor at the selected physical memory location.

In accordance with one or more embodiments of the invention, prior to receiving the request to access data in the partitioned memory, contents of the primary memory location are copied into the secondary memory location and the page table is updated to indicate that the virtual address corresponds to both the first physical address and the second physical address. The copying can be responsive to the second processor accessing the data more than a threshold number of times and/or responsive to a software instruction (application and/or OS). Prior to the copying, the second processor accesses the data at the primary memory location via the first processor. Subsequent to the copying the second processor accesses the data at the secondary location.

In accordance with one or more embodiments of the invention, the accesses can include reads, writes and/or deletions. When the access is a write access, the data stored in the secondary memory location can be invalidated, new data written to the primary memory location as indicated by the first physical address, and the contents of the page table updated to indicate that only the first physical address corresponds to the virtual address. When the access is a delete, the data stored in both the primary memory location and the secondary memory location can be invalidated and the contents of the page table updated to remove the corresponding virtual address.

In accordance with one or more embodiments of the invention, one of the physical addresses is selected to service the request based at least in part on attributes of the requestor and attributes of the physical locations of the data. For example, an attribute of a requesting processor can include, but is not limited to memory partitions that the processor is locally connected to by a memory bus. If one of the physical addresses is contained in a memory partition that is locally connected to the requesting processor, then the physical location in the locally connected partition can be selected. In accordance with one or more embodiments of the invention, when it is determined that the requesting processor is the second processor the second physical address is selected, and when it is determined that the requesting processor is the first processor, the first physical address is selected.

If one of the physical addresses is not contained in a memory partition that is locally connected to the requesting processor then other attributes such as, but not limited to available bandwidth, latency, queue depths, or bus speed between the requesting processor and the memory partition can be used to select the physical address.

Figure 4:
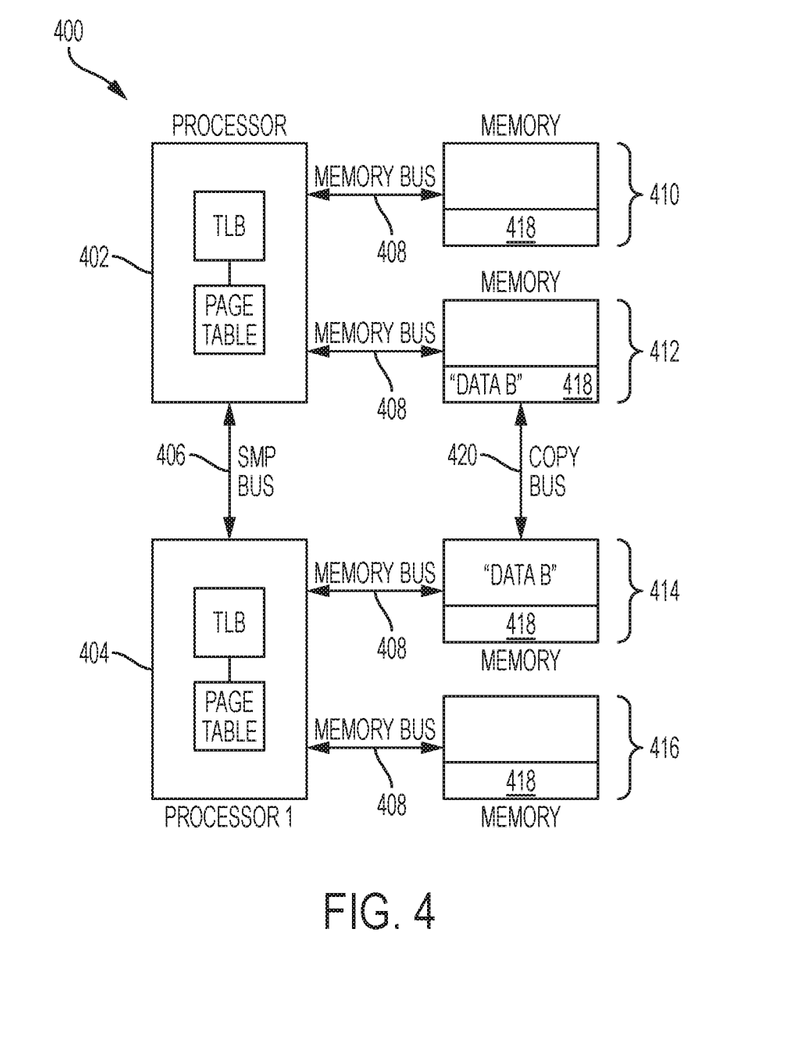
FIG. 4 is a block diagram of a system with locally aggregated copy pools with a link between the memory partitions in accordance with one or more embodiments of the invention.

Turning now to FIG. 4, a block diagram of a system 400 with locally aggregated copy pools is generally shown in accordance with one or more embodiments of the invention. The system 400 shown in FIG. 4 includes a plurality of processors 402 404 each connected to a plurality of memory partitions 410 412 414 416 via memory busses 408, and connected to connected to each other via a SMP bus 406. Four copy pools, or copy blocks 418 are also depicted in the system 400. Also as shown in FIG. 4, each of the processors 402 404 also include a translation look-aside buffer (TLB) and a page table. When compared to the system 200 shown in FIG. 2, the embodiment of the system 400 shown in FIG. 4 includes a copy block 418 in every partition 410 412 414 416, and a separate physical copy bus 420 for moving data between the memory partitions 410 412 414 416. By having the copy bus 420 as a secondary bus between memory subsystems, contents of memory locations can be copied without adding additional traffic to the SMP bus 406. In addition, the copy bus 420 can be dedicated to copying data between memory subsystems and not shared with other tasks. In accordance with one or more embodiments of the invention, the copy bus 420 can have bandwidths on the order of 40 GB/s significantly reducing pressure on the inter-processor SMP bus. In one or more embodiments of the invention, a copy bus 420 is used in conjunction with off-chip memory buffer.

For ease of description, the example in FIG. 4 shows two processors, however embodiments of the invention are not limited to two processors. The number of physical addresses corresponding to one logical address can increase based at least in part on the number of processors connected by SMP busses. For example, when there are three processors, each logical address can corresponding to up to three physical addresses; and when there are "N" processors, each logical address can correspond to up to "N" physical addresses.

Figure 5:
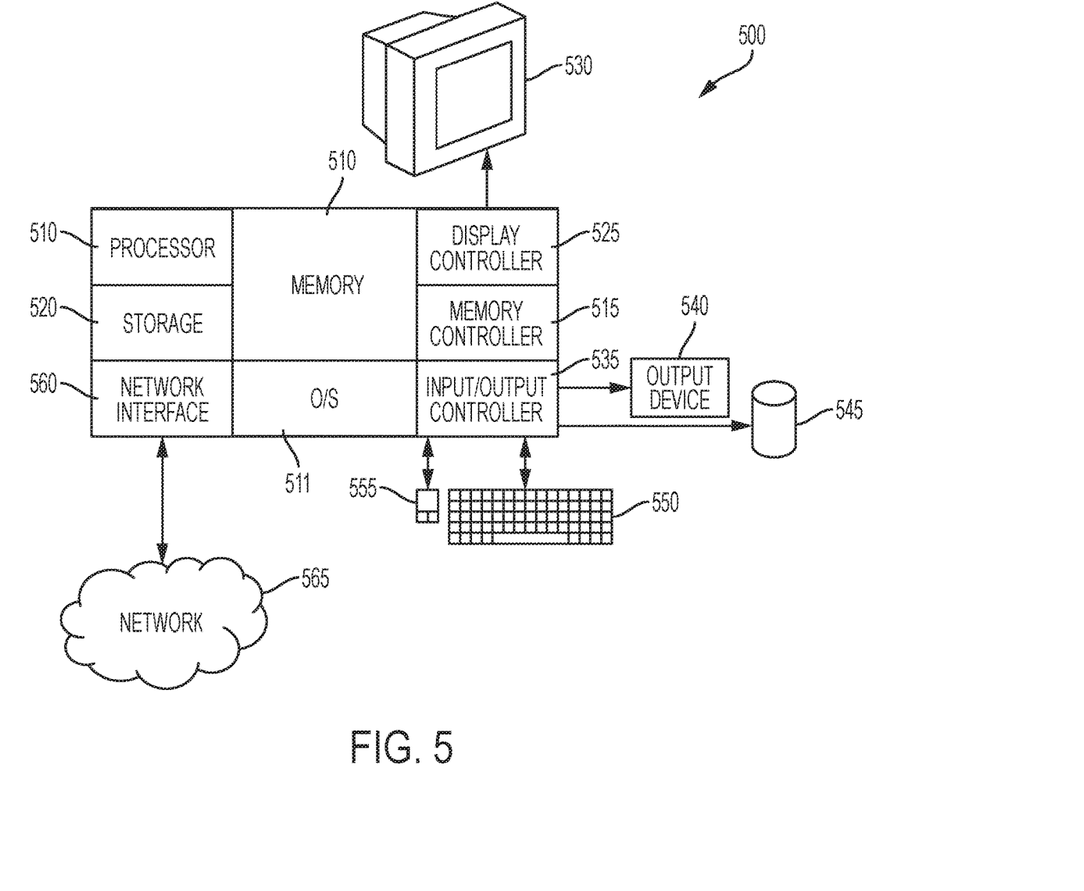
FIG. 5 is a block diagram of a computing device for implementing some or all aspects of a partitioned memory system with locally aggregated copy pools in accordance with one or more embodiments of the invention.

Turning now to FIG. 5, a block diagram of a computer system 500 for use in implementing some or all aspects of a partitioned memory system with locally aggregated copy pools is generally shown according to some embodiments of the invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the dispatch systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing a partitioned memory system with locally aggregated copy pools as described herein can be embodied, in whole or in part, in computer program products or in computer systems 500, such as that illustrated in FIG. 5.

Technical effects and benefits of embodiments of the invention include the ability to reduce traffic on a SMP bus between processors that require access to the same data that is natively stored in a partition local to one of the processors. In addition, by adding a second copy of the data in a partition that is local to the requesting processor, the time to service a request to access the data can be decreased.

The terminology used herein is for the purpose of describing particular embodiments of the invention only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments of the invention were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory having computer readable instructions; and
a plurality of processors for executing the computer readable instructions, the computer readable instructions controlling one or more of the plurality of processors to perform operations comprising:
receiving a request to access data in a partitioned memory split across a first and second processor of the plurality of processors, the request from a requesting processor of the plurality of processors and including a virtual address of the data;

determining, based at least in part on contents of a page table, that a plurality of physical addresses in the memory correspond to the virtual address, the physical addresses comprising:

a first physical address of a primary memory location in a first partition accessed via a first memory bus communicatively coupled to a port of the first processor; and a second physical address of a secondary memory location in a second partition accessed via a second memory bus communicatively coupled to a port of the second processor, wherein contents of the primary memory location in the first partition were previously copied into the secondary memory location in the second partition;

selecting, based at least in part on the requesting processor, one of the physical addresses; and accessing the data at the selected physical address.

2. The system of claim 1, wherein the operations further comprise, prior to receiving the request, copying contents of the primary memory location into the secondary memory location and updating the page table to indicate that the virtual address corresponds to both the first physical address and the second physical address, wherein the copying is responsive to the second processor accessing the data more than a threshold number of times, and wherein prior to the copying, the second processor accesses the data at the primary memory location via the first processor and the first memory bus, and subsequent to the copying the second processor accesses the data at the secondary location via the second memory bus.

3. The system of claim 1, wherein the operations further comprise, prior to receiving the request, copying contents of the primary memory location into the secondary memory location and updating the page table to indicate that the virtual address corresponds to both the first physical address and the second physical address, wherein the copying is responsive to a software instruction, and wherein prior to the copying, the second processor accesses the data at the primary memory location via the first processor and the first memory bus, and subsequent to the copying the second processor accesses the data at the secondary location via the second memory bus.

4. The system of claim 1, wherein the access is a write access and the operations further comprises:

invalidating the data stored in the secondary memory location, the invalidating including updating contents of the page table to indicate that a single physical address equal to the first physical address corresponds to the virtual address; and writing a new data value included in the request to the primary memory location.

5. The system of claim 1, wherein the access is a read access.

6. The system of claim 1, wherein the requesting processor is the second processor and the second physical address is selected.

7. The system of claim 1, wherein the requesting processor is the first processor and the first physical address is selected.

8. A computer program product comprising a computer readable storage medium having program instructions embodied therewith, the program instructions executable by a processing device to cause the processing device to perform operations comprising:

receiving a request to access data in a partitioned memory split across a first and second processor of a plurality of processors, the request from a requesting processor of the plurality of processors and including a virtual address of the data;

determining, based at least in part on contents of a page table, that a plurality of physical addresses in the memory correspond to the virtual address, the physical addresses comprising:

a first physical address of a primary memory location in a first partition accessed via a first memory bus communicatively coupled to a port of the first processor; and a second physical address of a secondary memory location in a second partition accessed via a second memory bus communicatively coupled to a port of the second processor, wherein contents of the primary memory location in the first partition were previously copied into the secondary memory location in the second partition;

selecting, based at least in part on the requesting processor, one of the physical addresses; and accessing the data at the selected physical address.

9. The computer program product of claim 8, wherein the program instructions further cause the processor to perform, prior to receiving the request, copying contents of the primary memory location into the secondary memory location and updating the page table to indicate that the virtual address corresponds to both the first physical address and the second physical address, wherein the copying is responsive to the second processor accessing the data more than a threshold number of times, and wherein prior to the copying, the second processor accesses the data at the primary memory location via the first processor and the first memory bus, and subsequent to the copying the second processor accesses the data at the secondary location via the second memory bus.

10. The computer program product of claim 8, wherein the program instructions further cause the processor to perform, prior to receiving the request, copying contents of the primary memory location into the secondary memory location and updating the page table to indicate that the virtual address corresponds to both the first physical address and the second physical address, wherein the copying is responsive to a software instruction, and wherein prior to the copying, the second processor accesses the data at the primary memory location via the first processor and the first memory bus, and subsequent to the copying the second processor accesses the data at the secondary location via the second memory bus.

11. The computer program product of claim 8, wherein the access is a write access and the operations further comprises:

invalidating the data stored in the secondary memory location, the invalidating including updating contents of the page table to indicate that a single physical address equal to the first physical address corresponds to the virtual address; and writing a new data value included in the request to the primary memory location.

* * * * *